United States Patent
Govindasamy et al.

(10) Patent No.: US 12,032,706 B2
(45) Date of Patent: Jul. 9, 2024

(54) APPLICATION SECURITY SCORING

(71) Applicant: Kyndryl, Inc., New York, NY (US)

(72) Inventors: Duraimurugan Govindasamy, Round Rock, TX (US); Kavitha Suresh Kumar, Bangalore (IN); Puthukode G. Ramachandran, Austin, TX (US)

(73) Assignee: Kyndryl, Inc., New York, NY (US)

( * ) Notice: Subject to any disclaimer, the term of this patent is extended or adjusted under 35 U.S.C. 154(b) by 262 days.

(21) Appl. No.: 17/538,358

(22) Filed: Nov. 30, 2021

(65) Prior Publication Data

US 2023/0169179 A1   Jun. 1, 2023

(51) Int. Cl.
  *G06F 21/57*   (2013.01)
  *G06F 9/54*   (2006.01)
  *G06N 20/00*   (2019.01)

(52) U.S. Cl.
  CPC .............. *G06F 21/577* (2013.01); *G06F 9/54* (2013.01); *G06N 20/00* (2019.01); *G06F 2221/033* (2013.01)

(58) Field of Classification Search
  CPC ..... G06F 21/577; G06F 9/54; H04L 63/1433; G06N 20/00
  See application file for complete search history.

(56) References Cited

U.S. PATENT DOCUMENTS

| | | | |
|---|---|---|---|
| 9,032,521 B2 | 5/2015 | Amini et al. | |
| 9,258,321 B2 | 2/2016 | Amsler et al. | |
| 9,516,053 B1 | 12/2016 | Muddu et al. | |
| 10,812,504 B2 | 10/2020 | Smith et al. | |
| 11,757,907 B1 * | 9/2023 | Berger | H04L 63/1425 726/23 |
| 2016/0269378 A1 | 9/2016 | Ye | |
| 2020/0177613 A1 * | 6/2020 | Nilangekar | G06F 21/577 |
| 2020/0356663 A1 | 11/2020 | Paturi et al. | |
| 2020/0366693 A1 | 11/2020 | Perilli | |
| 2021/0279337 A1 * | 9/2021 | Mosby | G06N 20/00 |
| 2022/0004642 A1 * | 1/2022 | Pujar | G06F 21/577 |
| 2022/0156383 A1 * | 5/2022 | Schwarzbauer | G06F 21/6245 |
| 2022/0351433 A1 * | 11/2022 | King | G06V 10/82 |
| 2022/0407891 A1 * | 12/2022 | Albanese | H04L 63/1433 |
| 2023/0012722 A1 * | 1/2023 | Del Rosario | G06F 21/577 |

(Continued)

FOREIGN PATENT DOCUMENTS

CN   109698823 B   5/2021

OTHER PUBLICATIONS

Mell et al., "The NIST Definition of Cloud Computing", NIST, Special Publication 800-145, Sep. 2011, 7 pages.

(Continued)

*Primary Examiner* — Thaddeus J Plecha
(74) *Attorney, Agent, or Firm* — Dan Housley; Andrew M. Calderon; Calderon Safran & Wright, P.C.

(57) ABSTRACT

A method includes receiving, by a computing device, metrics identifying vulnerabilities in an application; collecting, by the computing device, information related to the vulnerabilities; assigning, by the computing device, weights to the metrics using collected information; applying, by the computing device, a machine learning model on the weighted metrics; and generating, by the computing device, a predictive score for the vulnerabilities using the machine learning model.

20 Claims, 7 Drawing Sheets

(56) References Cited

U.S. PATENT DOCUMENTS

2023/0019941 A1\* 1/2023 Doyle .................. G06F 8/77

OTHER PUBLICATIONS

Anonymous, "The EPSS Model", Forum of Incident Response and Security, https://www.first.org/epss/model, 2015, 6 pages.
Anonymous, "Microsoft Secure Score", https://docs.microsoft.com/en-us/microsoft-365/security/defender/microsoft-secure-score?view=o365-worldwide, Nov. 18, 2021, 6 pages.

\* cited by examiner

APPLICATION SECURITY SCORING

BACKGROUND

Aspects of the present invention relate generally to computing applications and, more particularly, to application security scoring.

Vulnerabilities arise in applications during the development and deployment of applications.

SUMMARY

In a first aspect of the invention, there is a computer-implemented method including: receiving, by a computing device, metrics identifying vulnerabilities in an application; collecting, by the computing device, information related to the vulnerabilities; assigning, by the computing device, weights to the metrics using the collected information; applying, by the computing device, a machine learning model on the weighted metrics; and generating, by the computing device, a predictive score for the vulnerabilities using the machine learning model.

In another aspect of the invention, there is a computer program product including one or more computer readable storage media having program instructions collectively stored on the one or more computer readable storage media. The program instructions are executable to: receive metrics identifying vulnerabilities in an application from a user device; collect information related to the vulnerabilities from external sources; assign weights to the metrics; apply a machine learning model on the weighted metrics; and generate a predictive score for the vulnerabilities using the machine learning model.

In another aspect of the invention, there is system including a processor, a computer readable memory, one or more computer readable storage media, and program instructions collectively stored on the one or more computer readable storage media. The program instructions are executable to: receive metrics identifying vulnerabilities in an application from a user device using an API; collect information related to the vulnerabilities from social media comments; assign weights to the metrics using collected information; apply a machine learning model on the weighted metrics; and generate a predictive score for the vulnerabilities using the machine learning model.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
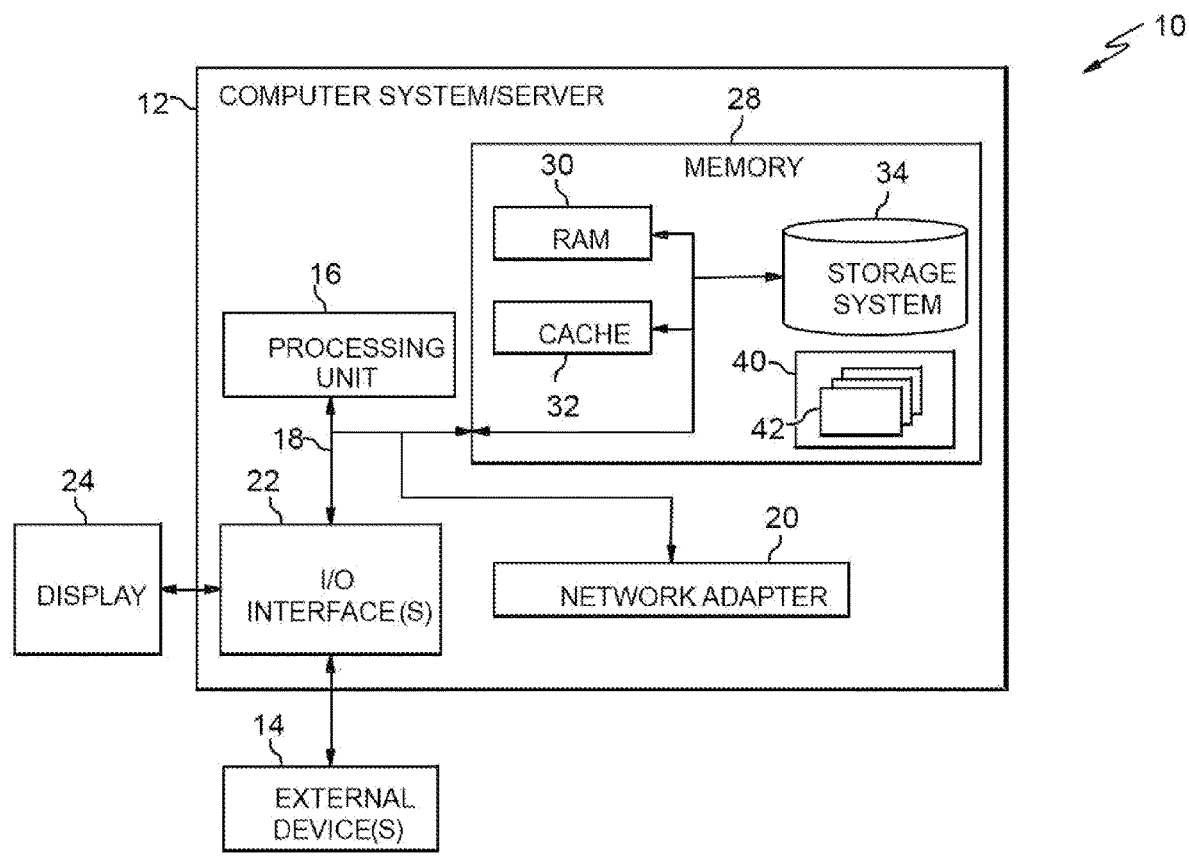
FIG. 1 depicts a cloud computing node according to an embodiment of the present invention.

Aspects of the present invention relate generally to computing infrastructure and, more particularly, to infrastructure security scoring. According to aspects of the invention, systems and processes identify vulnerabilities in an application by collecting metrics from development, security, and operations (DevSecOps) tools of the application. In embodiments, the systems and processes display these metrics in a dashboard so that a security posture of the application is visible. In further embodiments, in addition to the metrics from the DevSecOps tools, the systems and processes collect additional information for the identified vulnerabilities from other sources. In embodiments, the systems and processes use the additional information to identify a severity of the vulnerabilities. In further embodiments, the systems and processes use the identified vulnerabilities, the additional information, and the severity of the inputs to predict a security score of the application. In this manner, implementations of the invention allow for multiple sources to provide a security posture of an application.

In embodiments, the systems and processes assess security of an application using metrics from DevSecOps tools. In embodiments, the systems and processes identify vulnerabilities for an application by utilizing a plurality of DevSecOps tools (e.g., static scan, dynamic scan, open-source license compliance scan, dependency tracking, vulnerability scan, etc.). In embodiments, the systems and processes collect information regarding the vulnerabilities from external sources (e.g., vulnerability databases, social media comments, etc.). In embodiments, the systems and processes use natural language processing to identify a severity of the identified vulnerabilities from the collected information. In embodiments, the systems and processes train an artificial intelligence (AI) algorithm to generate security scores for applications using the identified vulnerabilities, the collected information, and the severity as inputs.

Implementations of the invention provide improvements to computing technologies by identifying vulnerabilities in a computing infrastructure. Specifically, aspects of the invention collect metrics of vulnerabilities from DevSecOps tools (e.g., static scan, dynamic scan, open-source license compliance scan, dependency tracking, vulnerability scan, etc.). In response to identifying the vulnerabilities, the systems and processes collect information regarding the vulnerabilities from external sources (e.g., vulnerability databases, social media comments, etc.). In embodiments, the systems and processes use the information from the external sources to identify a severity of the vulnerabilities. In embodiments, the systems and processes predict a security score for an application using the metrics and the information from the external sources. Accordingly, the systems and processes improve computing technologies by identifying vulnerabilities in a computing infrastructure and displaying a severity of these vulnerabilities.

In addition, the steps for identifying vulnerabilities in a computing infrastructure are unconventional. In embodiments, aspects of the invention: a) receive metrics identifying vulnerabilities in an application; b) compute a score using the metrics; c) display the score; d) collect information related to the vulnerabilities; e) assign weights to the metrics and collected information; f) apply a machine learning model on the weighted metrics; g) generate a predictive score for the vulnerabilities using the machine learning model; and h) display the predictive score. These unconventional steps allow for identifying vulnerabilities in a computing infrastructure and displaying a severity of these vulnerabilities.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
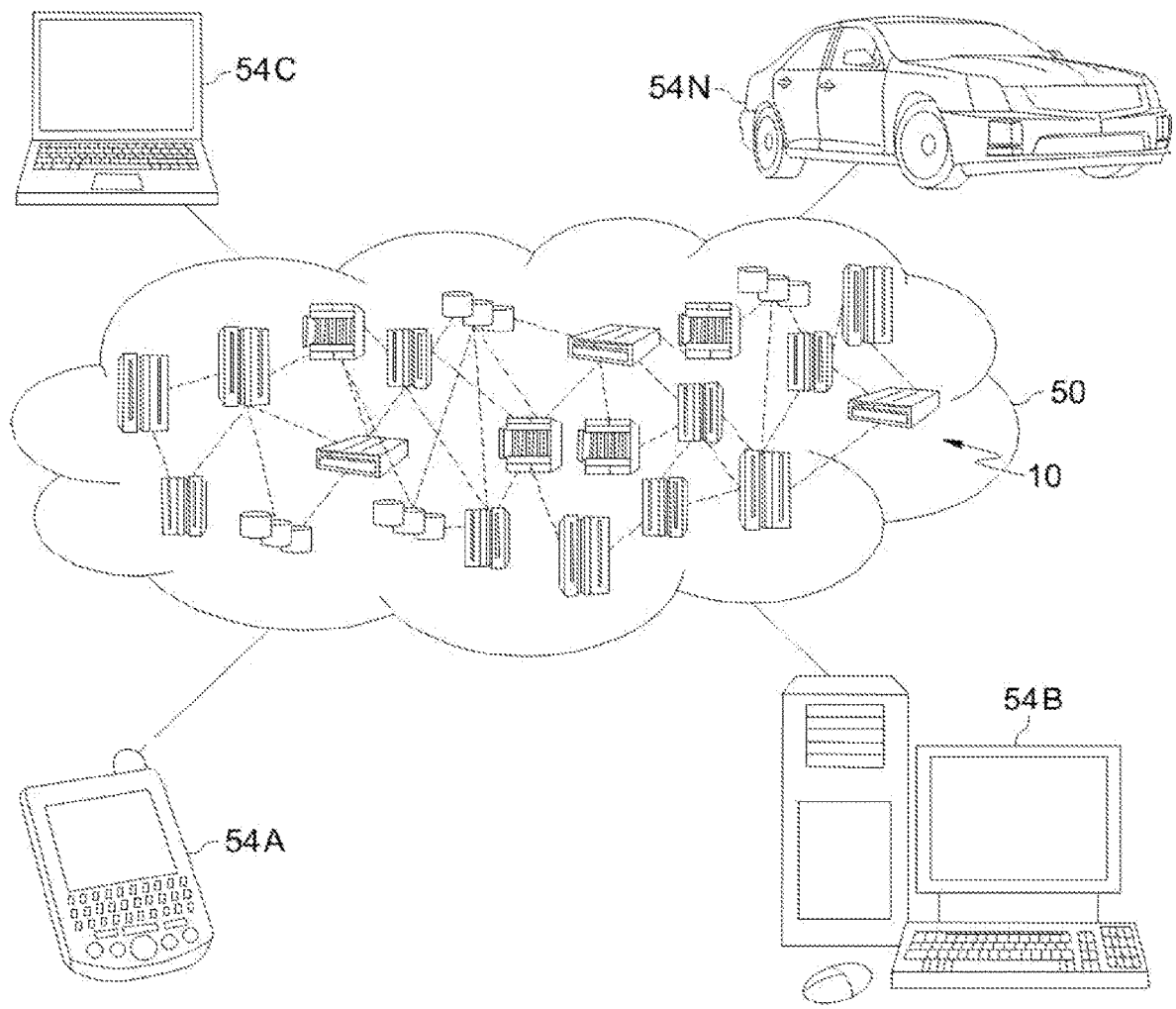
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
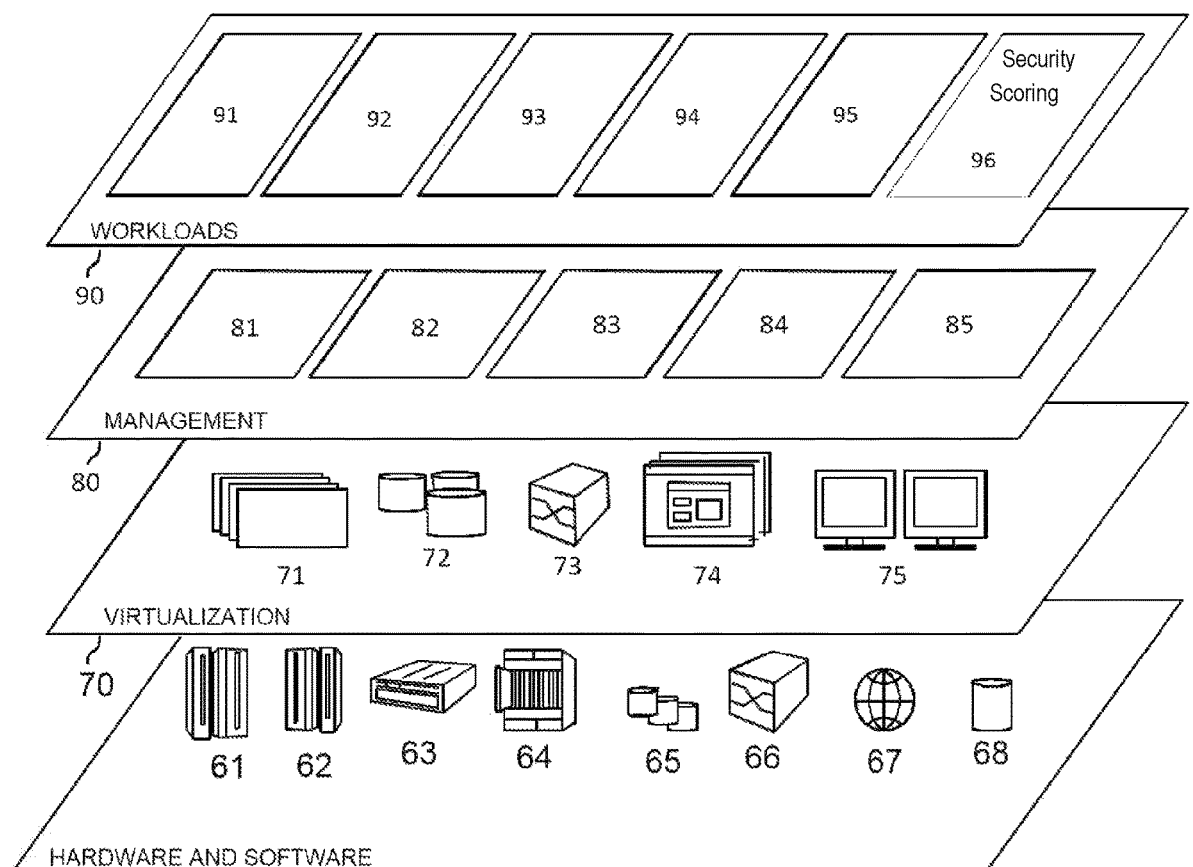
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security scoring 96.

Implementations of the invention may include a computer system/server 12 of FIG. 1 in which one or more of the program modules 42 are configured to perform (or cause the computer system/server 12 to perform) one of more functions of the security scoring 96 of FIG. 3. For example, the one or more of the program modules 42 may be configured to: a) receive metrics identifying vulnerabilities in an application; b) compute a score using the metrics; c) display the score; d) collect information related to the vulnerabilities; e) assign weights to the metrics and collected information; f) apply a machine learning model on the weighted metrics; g) generate a predictive score for the vulnerabilities using the machine learning model; and h) display the predictive score.

Figure 4:
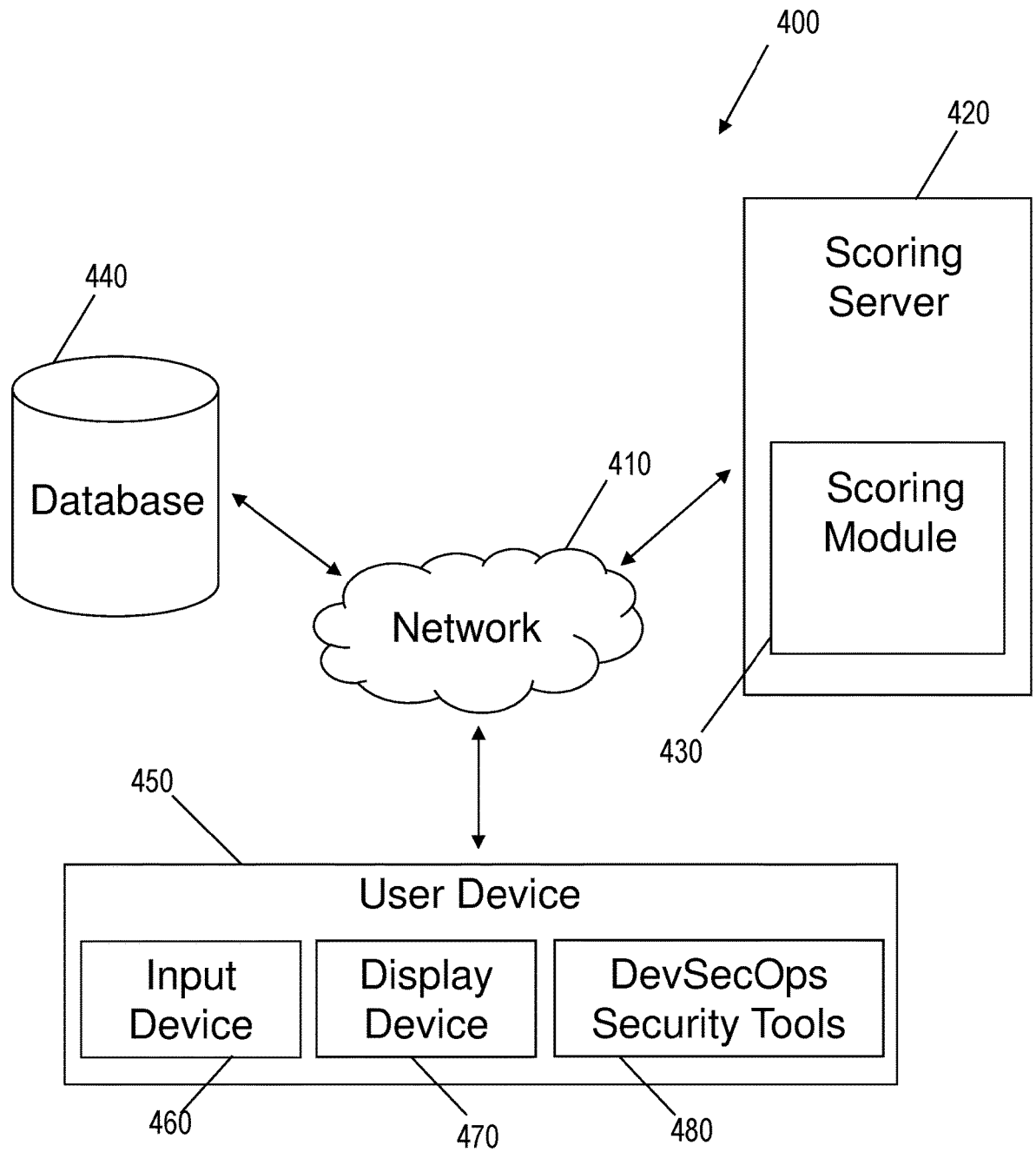
FIG. 4 shows a block diagram of an exemplary environment in accordance with aspects of the invention.

FIG. 4 shows a block diagram of an exemplary environment in accordance with aspects of the invention. In embodiments, the environment 400 includes a network 410, a scoring server 420, a database 440, and a user device 450. The scoring server 420 is a computing device comprising one or more components of computer system/server 12 of FIG. 1. In embodiments, the user device 450 may be a smartphone, a laptop computer, a desktop computer, and a tablet computer, for example, and comprises one or more components of computer system/server 12 of FIG. 1. In embodiments, the user may be a software engineer, a software developer, or any other software professional.

In embodiments, the user device 450 includes an input device 460 and a display device 470. In embodiments, the input device 460 includes a mouse, a keyboard, and a microphone, amongst other input device examples. In embodiments, the display device 470 is a screen which displays information on the user device 450 to a user of the user device 450. In embodiments, the user device 450 also includes development, security, and operations (DevSecOps) tools 480, which automate an integration of security at phases of a software development lifecycle, e.g., initial design, integration, testing, deployment, and delivery.

In embodiments, the scoring server 420 comprises a scoring module 430, which comprises one or more program modules such as program modules 42 described with respect to FIG. 1. The scoring server 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the network 410 is any suitable network including any combination of one or more of a LAN, WAN, or the Internet. In a particular embodiment, the network 410 is representative of a cloud computing environment 50 as described in FIG. 2.

In embodiments, Development, Security, and Operations (DevSecOps) help achieve application and infrastructure security at relatively early stages of software development based on processes and tooling automation. In embodiments, DevSecOps include various security tools. Examples of these various security tools include a static scan tool, a dynamic scan tool, an open-source license compliance tool along with a pedigree review, a container scan tool, a dependency scan tool, a vulnerability scan tool, and a secrets scan tool, amongst other DevSecOps security tools within the continuous integration/continuous delivery (CI/CD) pipeline of software development. An example of a static scan tool is a tool which scans for security vulnerabilities in static code of the application. An example of a dynamic scan tool is a tool which scans for security vulnerabilities in a dynamic portion of code of the application. An example of an open-source license compliance tool is a tool which determines whether open-source packages in the application code comply with organization open-source policy. An example of a container scan tool is a tool which scans each container for deployment vulnerabilities. An example of a dependency scan tool is a tool which scans for dependencies between different portions of code. A vulnerability scan tool is a tool which scans for vulnerabilities arising from the different stages of software development.

In embodiments, each of the security tools provide a unique score, which is different from the other security tools. As an example, each tool may provide a different severity category. As further examples, each security tool may have a different naming convention and different scoring methodologies, amongst other differences. In this way, there is no consolidation of results for viewing. Accordingly, it can be difficult for an organization to take early action on security issues since the organization would be presented with different forms of data.

In embodiments, the scoring module 430 addresses this issue of different forms of data by receiving metrics of vulnerabilities in an application from the DevSecOps security tools. In further embodiments, the scoring module 430 collects information from external sources regarding the identified vulnerabilities and uses natural language processing to identify a severity of the identified vulnerabilities from the collected information. In embodiments, the scoring module 430 generates a predictive score using the identified vulnerabilities, the collected information, and the severity as inputs. In this way, the scoring module 430 allows for a predictive analysis of an application security posture and scoring using different data sets pulled via DevSecOps tools (e.g., static scan, dynamic scan, vulnerability scan, etc.) and external sources such as social media comments, an industry vulnerability feed database, a security events database, vendor events database, incidents database, breaches database, natural disasters database, disturbances database, community reaction database, and etc. Further, the scoring module 430 allows for an AI based algorithm, i.e., machine learning regression model, to provide predictive analysis insights and scoring. Accordingly, this predictive analysis from the scoring module 430 helps an organization take a relatively early action for security issues since the vulnerability data is based on data from various sources.

Figure 5A:
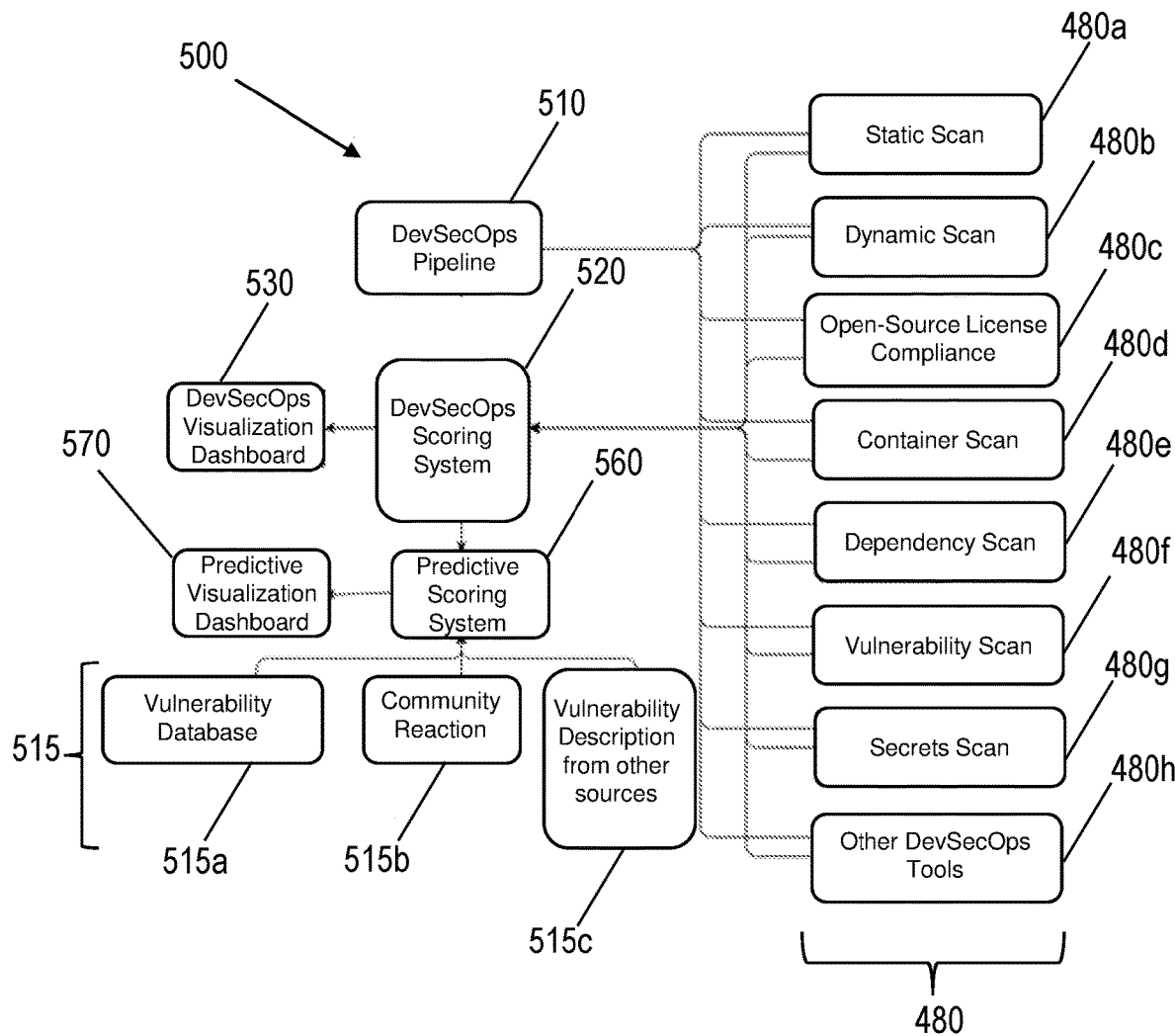
FIGS. 5A and 5B show scoring systems in accordance with aspects of the invention.
Figure 5B:
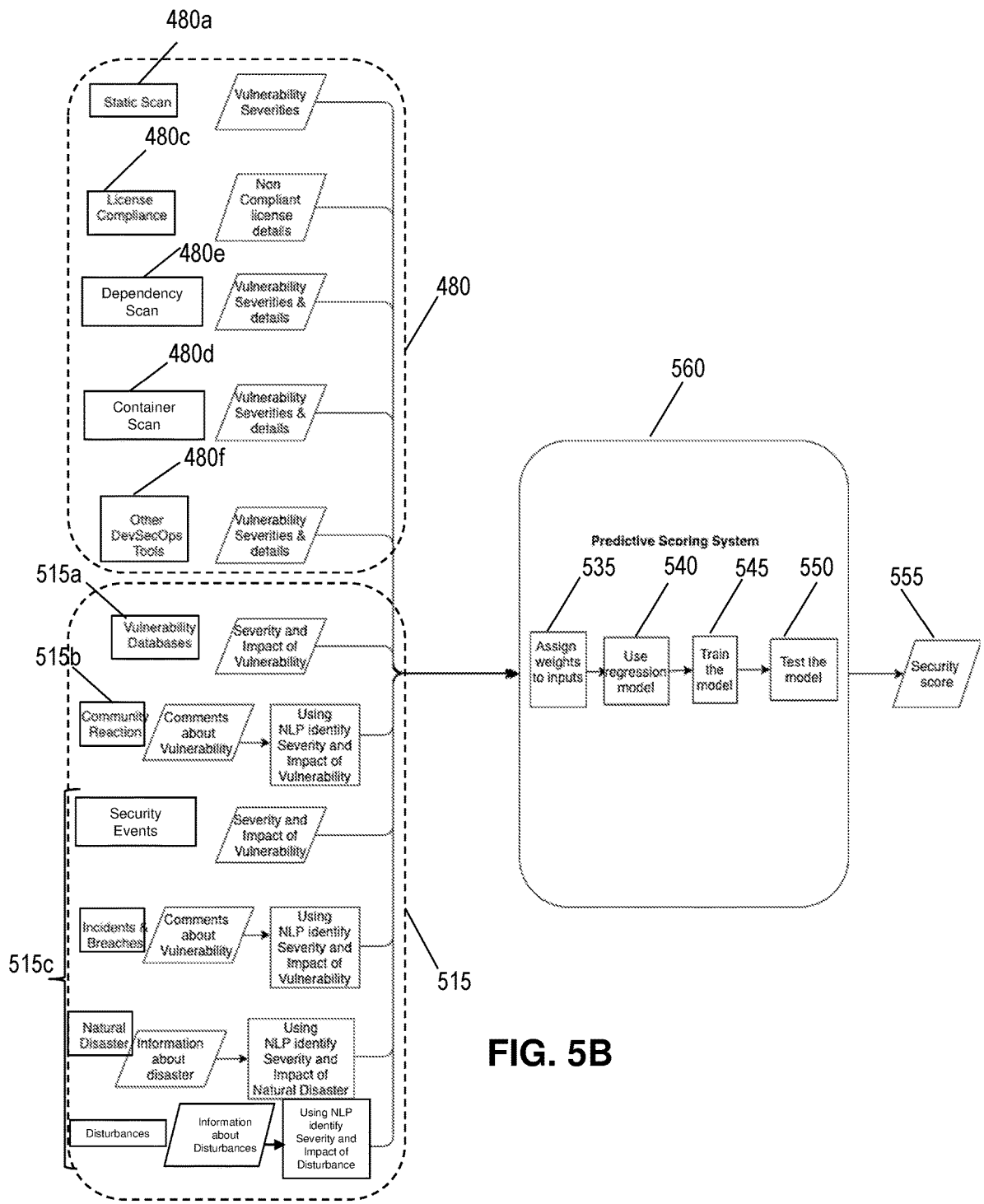

FIGS. 5A and 5B illustrate a scoring system 500 in accordance with aspects of the invention. FIGS. 5A and 5B are described with reference to elements depicted in FIG. 4. In embodiments, the scoring module 430 uses various inputs to generate a predictive score for the vulnerabilities of an application.

In embodiments, the scoring module 430 receives metrics identifying vulnerabilities from the DevSecOps security tools 480 of the user device 450. Specifically, the scoring module 430 receives metrics from the DevSecOps security tools 480 on the user device 450 through the network 410 by using an application programming interface (API) to interact with the user device 450. In further embodiments, the scoring module 430 receives metrics for DevSecOps security tools 505 from the user device 450 by submitting an API Key or password. In even further embodiments, the scoring module 430 receives the metrics from a DevSecOps pipeline 510 directly, in addition to or instead of the metrics from the tools DevSecOps tools 480 on the user device 450. In this way, the scoring module 430 receives the metrics directly from the DevSecOps security tools 505 and/or the DevSecOps pipeline 510. In embodiments, the DevSecOps pipeline 510 includes various software professionals developing and deploying the application. In embodiments, the DevSecOps security tools 505 providing the metrics include a static scan tool 480a, a dynamic scan tool 480b, an open-source license compliance tool 480c, a container scan tool 480d, a dependency scan tool 480e, a vulnerability scan tool 480f, a secrets scan tool 480g, and other DevSecOps tools 480h.

Continuing with FIG. 5A, the metrics are from various DevSecOps tools, including the following DevSecOps security tools 480: a static scan tool 480a, a dynamic scan tool 480b, an open-source license compliance tool 480c, container scan tool 480d, dependency scan tool 480e, vulnerability scan tool 480f, secrets scan tool 480g, and other DevSecOps tools 480h. In embodiments, the metrics include details of the vulnerabilities. Examples of the details include vulnerability categories and a date and time of the scan by a tool of the DevSecOps security tools 480, amongst other examples. In embodiments, the vulnerability categories include a critical vulnerability, a high vulnerability, a medium vulnerability, and a low vulnerability, amongst other examples.

In embodiments, the scoring module 430 assigns scores to the metrics and adds the scores together at the DevSecOps scoring system 520. In embodiments, the scores are numerical values based on the category type of the vulnerability. Examples of score assignments from the scoring module 430 include: a) for metrics from the static scan tool 480a, scores of "4" for a critical vulnerability, "3" for a high severity, "7" for a medium vulnerability, and a "20" for a low vulnerability; b) for metrics from the open-source license compliance tool 480c, scores of "10" for a critical vulnerability and "90" for a low vulnerability; c) for metrics from the dependency scan tool 480e, scores of "6" for a critical vulnerability, "2" for a high vulnerability, "10" for a medium vulnerability, and "30" for a low vulnerability; d) for metrics from the container scan tool 480d, scores of "2" for a critical vulnerability, "4" for a high vulnerability, "7" for a medium vulnerability, and "10" for a low vulnerability; and e) for metrics from the dynamic scan tool 480b, scores of "4" for a high vulnerability, "8" for a medium vulnerability, and "15" for a low vulnerability.

In embodiments, in response to assigning scores to the metrics, the scoring module 430 computes a total score for the vulnerabilities based on the metrics from the DevSecOps security tools 480. In embodiments, the scoring module 430 computes the score by adding up all the scores together. As an example, the scoring module 430 adds the scores of "6," "2," "8," "10," "4," and "12" for a total score of "42." In embodiments, the higher the score, the lower the severity of the vulnerability.

In embodiments, in response to computing the total score in the DevSecOps scoring system 520, the scoring module 430 generates a DevSecOps visualization dashboard 530. In embodiments, the DevSecOps visualization dashboard 530 is a single window which displays the total score, e.g., "42." In embodiments, the DevSecOps visualization dashboard includes an overall severity for the vulnerability of the application as a total score from scores of the metrics. In this way, the DevSecOps visualization dashboard 530 allows for users to view a single window for analyzing application security posture. In embodiments, these users include business information security officer (BISO)/chief information security officer (CISO), business executives, development managers, and security professionals. In embodiments, the scoring module 430 causes the user device 450 to display the DevSecOps visualization dashboard 530 on the display device 470 of the user device 450.

In embodiments, as shown in FIGS. 5A and 5B, the scoring module 430 collects information about the vulnerabilities from external sources 515 for use in the predictive scoring system 560. In embodiments, the scoring module 430 collects the information about the vulnerabilities by scanning different databases in the external sources 515. As shown in FIG. 5B, the external sources 515 include vulnerability database 515a, a community reaction 515b, and vulnerability description from other sources 515c, e.g., a security events feed, an incidents & breaches database, and natural disaster databases, amongst other examples. In embodiments, the vulnerability database 515a is a database which has historical vulnerability data. In embodiments, the community reaction includes social media and social media comments.

Continuing with FIG. 5B, in response to collecting the information from the external sources 515, the scoring module 430 assigns weights 535 for the metrics based on a severity of the vulnerabilities. In embodiments, the scoring module 430 determines the severity of the vulnerabilities by applying artificial intelligence (AI) onto the collected information from the external sources 515. As an example, the collected information includes text from the community reaction database 515b of the external sources 515. In response to the text, the scoring module 430 applies natural language processing (NLP) techniques to interpret the text to determine a severity of the vulnerability from the metrics of the vulnerability scan tool 480f. As a further example, the scoring module 430 determines that the severity is relatively critical in view of the NLP interpretation of the text indicating that a term of "critical" is found multiple times within the text. In this example, the metrics from the vulnerability scan tool 480f is given a greater weight because of the determination that the severity is relatively critical. In this example, a multiplier of greater than "1" is given to this metric since the severity is relatively critical. As further weighting examples, the scoring module 430 assigns: a) a weight multiplier of "1" to the metrics from the static scan tool 480a; b) a weight multiplier of "2" to the metrics from the open-source license compliance tool 480c; c) a weight multiplier of "3" to the metrics from the dependency scan tool 480e; d) a weight multiplier of "3" to the metrics from the container scan tool 480d; and e) a weight multiplier of "2" to the metrics from the dynamic scan tool 480b.

In embodiments, in response to assigning weights 535 to the metrics, the scoring module 430 applies a machine learning model 540 on the weighted metrics to generate a predictive security score 555. In embodiments, the machine learning model 540 is a regression model which uses regression techniques to determine an output, i.e., the predictive security score 555. As an example, the regression model determines an output of "50" as the predictive security score 555 in view of applying regressive techniques onto the weighted metrics. In embodiments, a higher score indicates a higher severity for the vulnerability. In this way, the higher the score, the higher the risk.

In embodiments, to generate the predictive security score 555, the scoring module 430 trains 545 the machine learning model with weighted metrics. Specifically, the training 545 includes the scoring module 430 inputting additional weighted metrics into the machine learning model 540 and generating predictive security scores using the additional weighted metrics. In embodiments, the scoring module 430 saves the weighted metrics and predictive security scores from the weighted metrics into the database 440 as historical data. As a more specific example of generating the predictive security score 555, an exemplary formula for the regression model is Y=B0+B1X1+B2X2+B3X3+ . . . +BnXn, with X1, X2, . . . Xn being independent variables and Y=the predictive security score 555. In embodiments, B1=Weighted metric used with vulnerability value from static scan tool 480a; X1=Vulnerability value from static scan tool 480a; B2=Weighted metric used with license compliance from open source compliance tool 480c; X2=License compliance value from open source compliance tool 480c; B3=Weighted metric used with vulnerability value from dependency scan tool 480e; X3=Vulnerability value from dependency scan tool 480e; B4=Weighted metric used with vulnerability value from container scan tool 480d; X4=Vulnerability value from container scan tool 480d; B5=Weighted metric used with vulnerability value from dynamic scan tool 480b; X5=Vulnerability from value dynamic scan tool 480b; B6=Weighted metric used with vulnerability value from vulnerability feed database; X6=Vulnerability from vulnerability feed database; B7=Weighted metric used with vulnerability value from community reaction database; and X7=Vulnerability value from community reaction database.

In embodiments, in addition to generating the predictive security score 555 and training 545 the machine learning model 540, the scoring module 430 tests 550 the machine learning model 540. In embodiments, the scoring module 430 tests 550 the machine learning model by comparing the predictive security score 555 to a predictive security score in the historical data for the same weighted metrics. Specifically, the scoring module 430 applies R-squared and adjusted R-squared measurements to the predictive security score 555 to evaluate the machine learning model. In response to having a match between the predictive security score 555 and the predictive security score in the historical data, the scoring module 430 determines that the predictive security score 555 is accurate.

In embodiments, in response to generating the predictive security score 555, the scoring module 430 generates a predictive visualization dashboard 570. In embodiments, the predictive visualization dashboard 530 is a single window which displays the total score, e.g., "42." In embodiments, the DevSecOps visualization dashboard includes an overall predictive severity for the vulnerability of the application as a total score from scores of the weighted metrics. In this way, in addition to the DevSecOps visualization dashboard 530, the predictive visualization dashboard 570 allows for users to view a single window for predictive application security posture. In embodiments, these users include security professionals. In embodiments, the scoring module 430 causes the user device 450 to display the predictive visualization dashboard 570 on the display device 470 of the user device 450.

Figure 6:
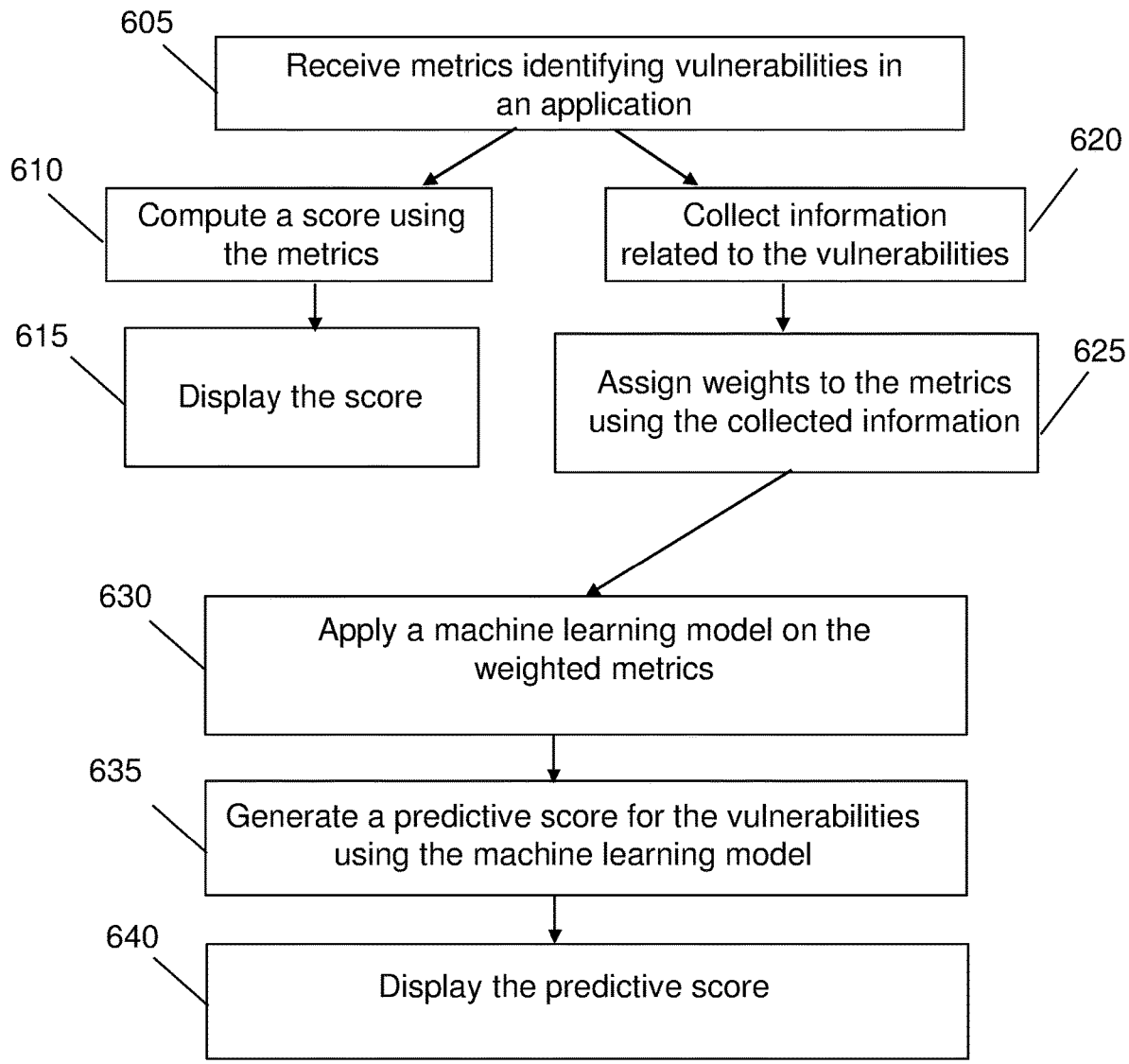
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIGS. 4-5B.

At step 605, the system receives metrics identifying vulnerabilities in an application. In embodiments, and as described with respect to FIGS. 4-5B, the scoring module 430 receives the metrics through the network 410 from the DevSecOps security tools 480 of the user device 450 by using an application programming interface (API) to interact with the user device 450. In further embodiments, the scoring module 430 receives the metrics from a DevSecOps pipeline 510 directly, in addition to or instead of the DevSecOps security tools 480.

At step 610, the system computes a score using the metrics. In embodiments, and as described with respect to FIGS. 4-5B, the scoring module 430 computes the score by assigning scores to the metrics and adding the scores together at the DevSecOps scoring system 520.

At step 615, the system displays the score. In embodiments, and as described with respect to FIGS. 4-5B, the scoring module 430 generates a DevSecOps visualization dashboard 530 and causes the user device 450 to display the DevSecOps visualization dashboard 530 on the display device 470 of the user device 450.

At step 620, the system collects information related to the vulnerabilities. In embodiments, and as described with respect to FIGS. 4-5B, the scoring module 430 collects information about the vulnerabilities from external sources 515.

At step 625, the system assigns weights to the metrics using the collected information. In embodiments, and as described with respect to FIGS. 4-5B, the scoring module 430 assigns weights to the metrics based on a severity of the vulnerabilities. In embodiments, the scoring module 430 determines the severity of the vulnerabilities by applying artificial intelligence (AI) onto the collected information from the external sources 515.

At step 630, the system applies a machine learning model on the weighted metrics. In embodiments, and as described with respect to FIGS. 4-5B, the scoring module 430 applies a regression model onto the weighted metrics.

At step 635, the system generates a predictive score for the vulnerabilities using the machine learning model. In embodiments, and as described with respect to FIGS. 4-5B, the scoring module 430 applies regression techniques on the weighted metrics to determine an output, i.e., predictive security score 555.

At step 640, the system displays the predictive score. In embodiments, and as described with respect to FIGS. 4-5B, the scoring module 430 generates a predictive visualization dashboard 570 and causes the user device 450 to display the predictive visualization dashboard 570 on the display device 470 of the user device 450

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, metrics identifying vulnerabilities in an application;
collecting, by the computing device, information related to the vulnerabilities;
determining, by the computing device, a severity of the vulnerabilities by applying artificial intelligence (AI) on the collected information related to the vulnerabilities;
assigning, by the computing device, weights to the metrics based on the determined severity of the vulnerabilities;
applying, by the computing device, a machine learning model on the weighted metrics; and
generating, by the computing device, a predictive score for the vulnerabilities using the machine learning model.

2. The method of claim 1, further comprising applying natural language processing (NLP) to interpret a text of the collected information to further determine the severity of the vulnerabilities, wherein the machine learning model is a regression model.

3. The method of claim 1, further comprising determining that the severity of the vulnerabilities is high in response to a term critical being found a plurality of times within a text of the collected information, wherein the metrics are from development, security, and operations (DevSecOps) tools.

4. The method of claim 3, wherein the DevSecOps tools are selected from the group consisting of a static scan tool, a dynamic scan tool, an open-source license compliance tool, a container scan tool, a dependency scan tool, and a vulnerability scan tool.

5. The method of claim 1, wherein the collecting the information related to the vulnerabilities includes collecting information from external sources.

6. The method of claim 5, wherein the external sources are selected from the group consisting of an industry vulnerability database, a security events database, a vendor events database, an incidents database, and a breaches database.

7. The method of claim 1, further comprising computing a score using the metrics.

8. The method of claim 7, further comprising displaying the score on a user device.

9. The method of claim 1, further comprising displaying the predictive score on a user device.

10. The method of claim 1, further comprising testing the machine learning model.

11. The method of claim 10, wherein the metrics are received from a user device using an application programming interface (API).

12. The method of claim 1, wherein the computing device includes software provided as a service in a cloud environment.

13. A computer program product comprising one or more computer readable storage media having program instructions collectively stored on the one or more computer readable storage media, the program instructions executable to:
receive metrics identifying vulnerabilities in an application from a user device;
collect information related to the vulnerabilities from external sources;
determine a severity of the vulnerabilities by applying artificial intelligence (AI) on the collected information related to the vulnerabilities;
assign weights to the metrics based on the determined severity of the vulnerabilities;
apply a machine learning model on the weighted metrics; and
generate a predictive score for the vulnerabilities using the machine learning model.

14. The computer program product of claim 13, wherein the machine learning model is a regression model.

15. The computer program product of claim 13, further comprising applying natural language processing (NLP) to interpret a text of the collected information to further determine the severity of the vulnerabilities.

16. The computer program product of claim 15, further comprising determining that the severity of the vulnerabilities is high in response to a term critical being found a plurality of times within the text of the collected information, wherein the metrics are from DevSecOps tools.

17. A system comprising:
a processor, a computer readable memory, one or more computer readable storage media, and program instructions collectively stored on the one or more computer readable storage media, the program instructions executable to:
receive metrics identifying vulnerabilities in an application from a user device using an API;
collect information related to the vulnerabilities from social media comments;
determine a severity of the vulnerabilities by applying artificial intelligence (AI) on the collected information related to the vulnerabilities;
assign weights to the metrics based on the determined severity of the vulnerabilities;
apply a machine learning model on the weighted metrics; and
generate a predictive score for the vulnerabilities using the machine learning model.

18. The system of claim 17, further comprising applying natural language processing (NLP) to interpret a text of the collected information to further determine the severity of the vulnerabilities, wherein the metrics are from DevSecOps tools.

19. The system of claim 18, further comprising determining that the severity of the vulnerabilities is high in response to a term critical being found a plurality of times within the text of the collected information, wherein the DevSecOps tools are selected from the group consisting of a static scan tool, a dynamic scan tool, an open-source license compliance tool along with pedigree review, a container scan tool, a dependency scan tool, and a vulnerability scan tool.

20. The system of claim 17, further comprising collecting information related to the vulnerabilities from an industry vulnerability database, a security events database, a vendor events database, an incidents database, and a breaches database.

* * * * *